(12) United States Patent
Shepelev

(10) Patent No.: US 9,715,291 B2
(45) Date of Patent: Jul. 25, 2017

(54) PRE-CHARGING A GATE ELECTRODE BEFORE RESUMING DISPLAY UPDATING

(71) Applicant: Synaptics Incorporated, San Jose, CA (US)

(72) Inventor: Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 325 days.

(21) Appl. No.: 14/151,783

(22) Filed: Jan. 9, 2014

(65) Prior Publication Data

US 2014/0368462 A1  Dec. 18, 2014

Related U.S. Application Data

(60) Provisional application No. 61/836,495, filed on Jun. 18, 2013.

(51) Int. Cl.
G06F 3/045 (2006.01)
G06F 3/041 (2006.01)
G06F 3/044 (2006.01)

(52) U.S. Cl.
CPC ........... *G06F 3/0412* (2013.01); *G06F 3/044* (2013.01); *G06F 3/0416* (2013.01)

(58) Field of Classification Search
CPC ...... G06F 3/0412; G06F 3/0416; G06F 3/044; G06F 5/01
See application file for complete search history.

(56) References Cited

U.S. PATENT DOCUMENTS

| 5,534,892 A * | 7/1996 | Tagawa | G06F 3/0412 178/20.01 |
|---|---|---|---|
| 5,896,120 A | 4/1999 | Iguchi et al. | |
| 6,239,788 B1 | 5/2001 | Nohno et al. | |
| 2004/0217945 A1 | 11/2004 | Miyamoto et al. | |
| 2005/0156860 A1* | 7/2005 | Kim | G09G 3/3677 345/100 |
| 2006/0012575 A1 | 1/2006 | Knapp et al. | |
| 2008/0061140 A1 | 3/2008 | McMahon | |
| 2008/0062139 A1 | 3/2008 | Hotelling et al. | |
| 2008/0062147 A1 | 3/2008 | Hotelling et al. | |

(Continued)

OTHER PUBLICATIONS

International Search Report and Written Opinion for Application No. PCT/US2014/039235, date of mailing Sep. 19, 2014, 10 pages.

*Primary Examiner* — Andrew Sasinowski
*Assistant Examiner* — Brent D Castiaux
(74) *Attorney, Agent, or Firm* — Patterson + Sheridan, LLP

(57) ABSTRACT

Embodiments of the present invention generally provide a display line selection system. The display line selection system includes a first register element configured to select a first gate electrode to update a first display line during a first display update period and transfer charge to a second register element during the first display update period. The second register element is configured to select a second gate electrode to update a second display line during a second display update period. The display line selection system further includes a third register element configured to receive charge during a non-display update period and transfer charge to a fourth register element during the non-display update period. The fourth register element is configured to select a third gate electrode to update a third display line during a third display update period.

20 Claims, 9 Drawing Sheets

(56) References Cited

U.S. PATENT DOCUMENTS

| | | |
|---|---|---|
| 2008/0062148 A1 | 3/2008 | Hotelling et al. |
| 2010/0001973 A1 | 1/2010 | Hotelling et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2011/0050585 A1 | 3/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahparnia et al. |
| 2012/0032911 A1 | 2/2012 | Jung et al. |
| 2012/0242597 A1 | 9/2012 | Hwang et al. |
| 2013/0050144 A1 | 2/2013 | Reynolds |
| 2013/0057511 A1 | 3/2013 | Shepelev et al. |
| 2013/0094126 A1* | 4/2013 | Rappoport ............ G02B 27/01 361/679.01 |
| 2013/0241814 A1* | 9/2013 | Hirabayashi ......... G09G 3/3677 345/100 |
| 2013/0342481 A1 | 12/2013 | Small et al. |

* cited by examiner

PRE-CHARGING A GATE ELECTRODE BEFORE RESUMING DISPLAY UPDATING

CROSS-REFERENCE TO RELATED APPLICATIONS

This application claims benefit of U.S. provisional patent application Ser. No. 61/836,495, filed Jun. 18, 2013, which is hereby incorporated herein by reference.

BACKGROUND OF THE INVENTION

Field of the Invention

Embodiments of the present invention generally relate to techniques for reducing display artifacts when resuming display updating in an integrated input device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes configured for both updating display lines and transmitting input sensing signals. In such shared electrode configurations, display updating and input sensing may be performed during separate time periods in order to reduce the likelihood of interference between these processes. For example, input sensing may be performed during one or more non-display update periods during which display updating is paused. However, when display updating is paused for an extended period of time to perform input sensing, components that are used to perform display updating may discharge. Consequently, when display updating is resumed after an input sensing period, the voltages across these components may be at lower-than-expected levels, generating display artifacts.

Therefore, there is a need for an improved technique for reducing display artifacts when resuming display updating in an integrated input device.

SUMMARY OF THE INVENTION

Embodiments of the present invention generally provide a display line selection system for a display device having an integrated capacitive sensing device. The display line selection system includes a first register element coupled to a first gate electrode and configured to select the first gate electrode to update a first display line during a first display update period and transfer charge to a second register element during the first display update period. The display line selection system further includes the second register element coupled to a second gate electrode and configured to select the second gate electrode to update a second display line during a second display update period. The display line selection system further includes a third register element configured to receive charge during a non-display update period and transfer charge to a fourth register element during the non-display update period. The display line selection system further includes the fourth register element coupled to a third gate electrode and configured to select the third gate electrode to update a third display line during a third display update period.

Embodiments of the present invention may further provide a method of input sensing with a display device having an integrated capacitive sensing device. The method includes driving a first register element coupled to a first gate electrode to select a first display line for display updating during a first display update period and transferring charge from the first register element to a second register element during the first display update period. The method further includes driving the second register element coupled to a second gate electrode to select a second display line for display updating during a second display update period. The method further includes driving one or more sensor electrodes for input sensing during a non-display update period. The method further includes charging a third register element during the non-display update period and transferring charge from the third register element to a fourth register element during the non-display update period. The method further includes driving the fourth register element coupled to a third gate electrode to select a third display line for display updating during a third display update period.

Embodiments of the present invention may further provide a processing system for a display device having an integrated sensing device. The processing system includes a driver module comprising driver circuitry. The driver module has outputs configured for coupling to a plurality of register elements and a plurality of sensor electrodes. The driver module is configured for driving a first register element coupled to a first gate electrode to select a first display line for display updating during a first display update period and transfer charge to a second register element during the first display update period. The driver module is further configured for driving the second register element coupled to a second gate electrode to select a second display line for display updating during a second display update period. The driver module is further configured for driving one or more sensor electrodes for input sensing during a non-display update period. The driver module is further configured for driving a third register element during the non-display update period to transfer charge to a fourth register element. The driver module is further configured for driving the fourth register element coupled to a third gate electrode to select a third display line for display updating during a third display update period. The processing system further includes a receiver module configured for coupling to a plurality of receiver electrodes and configured for receiving resulting signals with the plurality of receiver electrodes when the one or more sensor electrodes are driven for input sensing.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for reducing display artifacts when resuming display updating in an integrated input device. During operation of an integrated input device, display updating may be paused in order to perform input sensing and/or other processes during one or more non-display update periods, causing certain display elements to discharge during the non-display update period(s). In order to pre-charge these display elements to the expected levels prior to resuming display updating, one or more register elements (e.g., inactive register elements) may be included in the display device. Accordingly, during and/or after a non-display update period, the register element(s) may be driven to pre-charge the display components to the expected levels, reducing the incidence of display artifacts.

Figure 1:
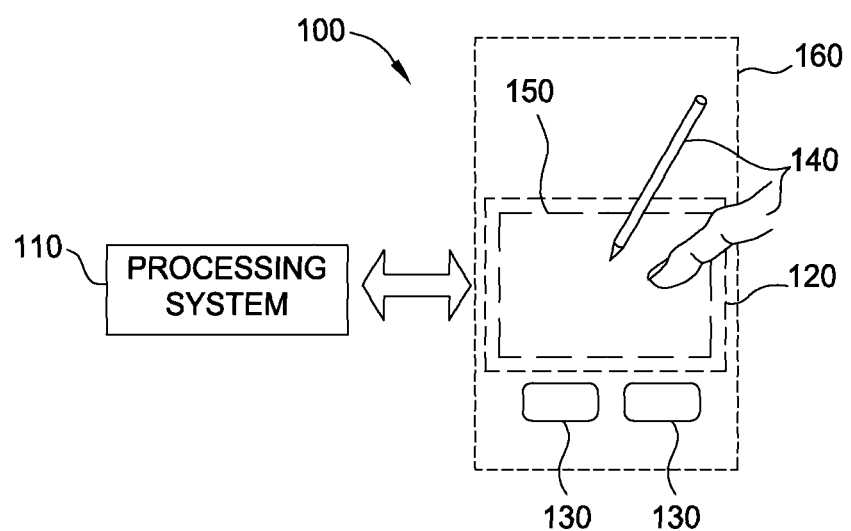
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I$^2$C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 150 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
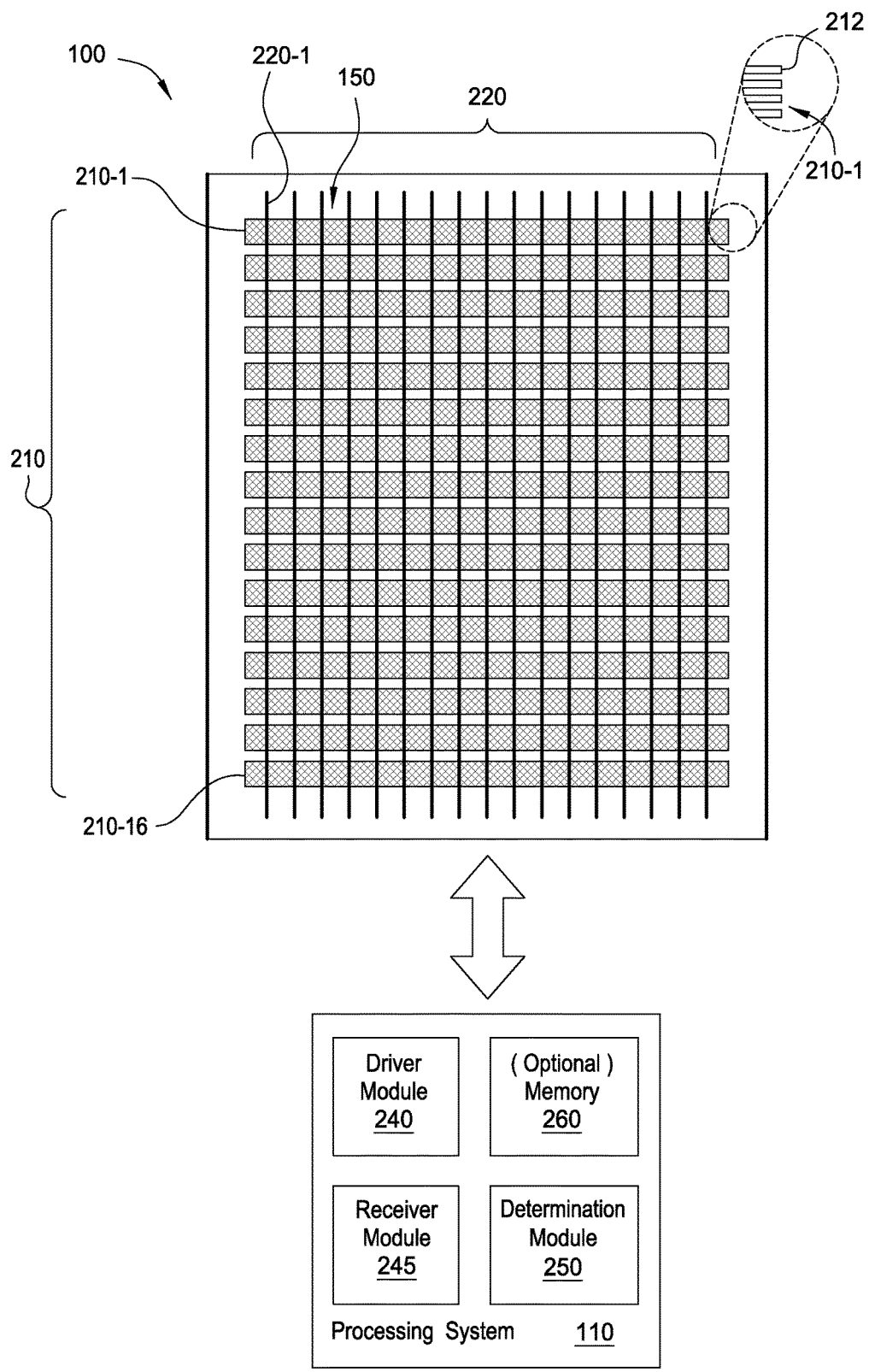
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes a first plurality of sensor electrodes 210 (e.g., 210-1, 210-2, 210-3, etc.) and a second plurality of sensor electrodes 220 (e.g., 220-1, 220-2, 220-3, etc.). Each sensor electrode of the first plurality of sensor electrodes 210 may comprise one or more common electrodes 212. Additionally, in various embodiments, each sensor electrode of the second plurality of sensor electrodes 220 may comprise one or more common electrodes. The processing system 110 is coupled to the array of sensing elements 150, for example, through one or more routing traces (not shown in FIG. 2).

Processing system 110 is configured to operate the first and second plurality of sensor electrodes for input sensing. For example, processing system 110 is configured to operate the first plurality of sensor electrodes as transmitter electrodes by driving the first plurality of sensor electrodes with transmitter signals and operate the second plurality of sensor electrodes as receive electrodes by receiving resulting signals with the second plurality of sensor electrodes. Further, processing system 110 is configured to operate the first plurality of sensor electrodes and the second plurality of sensor electrodes for absolute capacitive sensing by driving a modulated signal onto the sensor electrodes and receiving resulting signals with the sensor electrodes of the first and second plurality of sensor electrodes.

Although the processing system 110 is illustrated in FIG. 2 embodied as a single integrated circuit (IC), the input device 100 may include any appropriate number of ICs comprising the processing system 110. As shown in FIG. 2, the processing system 110 may include a driver module 240, a receiver module 245, a determination module 250, an optional memory 260, and/or a synchronization mechanism (not shown in FIG. 2).

The driver module 240 includes driver circuitry and may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes 212 to update one or more display lines of the display screen. In addition, the processing system 110 is configured to operate the common electrodes 212 as transmitter electrodes for input sensing by driving transmitter signals onto the common electrodes 212.

The receiver module 245 is coupled to the second plurality of sensor electrodes 210 and configured to receive resulting signals from the second plurality of sensor electrodes 210 indicative of input (or lack of input) in the sensing region 120 and/or of environmental interference. The receiver module 245 may also be configured to pass the resulting signals to the determination module 250 for determining the presence of an input object and/or to the optional memory 260 for storage.

The functions of the processing system 110 may be implemented in more than one IC to control the display module elements (e.g., common electrodes 212) and drive transmitter signals and/or receive resulting signals received from the array of sensing elements 150. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

In various embodiments, the first plurality of sensor electrodes 210 and the second plurality of sensor electrodes 220 are ohmically isolated from each other by one or more insulators which separate the first plurality of sensor electrodes 210 and the second plurality of sensor electrodes 220 and prevent them from electrically shorting to each other. The electrically insulative material separates the first plurality of sensor electrodes 210 and the second plurality of sensor electrodes 220 at cross-over areas at which the electrodes intersect. In one such configuration, the first plurality of sensor electrodes 210 and the second plurality of sensor electrodes 220 are formed with jumpers connecting different portions of the same electrode. In other configurations, the first plurality of sensor electrodes 210 and the second plurality of sensor electrodes 220 are separated by one or more layers of electrically insulative material or by one or more substrates, as described in further detail below. In still other configurations, the first plurality of sensor electrodes 210 and the second plurality of sensor electrodes 220 are optionally disposed on a single layer of the input device 100. In yet other configurations, the first and second plurality of sensor electrodes may be disposed in a matrix. A matrix sensor electrode arrangement may comprise a plurality of zero-dimensional input areas, where each zero-dimensional input area may correspond to a single sensor electrode of the first or second pluralities of sensor electrodes or multiple sensor electrodes from one or both of the first and second pluralities of sensor electrodes. In any of the above configurations, one or more of the sensor electrodes may be configured to operate as a shield electrode to shield and/or guard other sensor electrodes.

The areas of localized capacitive coupling between first plurality of sensor electrodes 210 and the second plurality of sensor electrodes 210 may be termed "capacitive pixels." The capacitive coupling between the first plurality of sensor electrodes 210 and the second plurality of sensor electrodes 210 changes with the proximity and motion of input objects in the sensing region 120 associated with the first plurality of sensor electrodes 210 and the second plurality of sensor electrodes 210.

In some embodiments, the sensor pattern is "scanned" to determine these capacitive couplings. That is, the first plurality of sensor electrodes 210 are driven to transmit transmitter signals. Transmitters may be operated such that one sensor electrode included in the first plurality of sensor electrodes 210 transmits at one time, or multiple sensor electrodes included in the first plurality of sensor electrodes 210 transmit at the same time. Where multiple sensor electrodes included in the first plurality of sensor electrodes 210 transmit simultaneously, these multiple sensor electrodes may transmit the same transmitter signal and effectively produce an effectively larger sensor electrodes, or these multiple sensor electrodes may transmit different transmitter signals. For example, multiple sensor electrodes included in the first plurality of sensor electrodes 210 may transmit different transmitter signals according to one or more coding schemes that enable their combined effects on the resulting signals of the second plurality of sensor electrodes 210 to be independently determined.

The second plurality of sensor electrodes 210 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Input Sensing During Non-Display Update Periods

In various embodiments, the common electrodes and/or other display elements (e.g., gate select lines, source lines, storage capacitors, etc.) may be used both to update the display and to perform input sensing. In order to reduce the likelihood of interference between these processes, display updating and input sensing may be performed during separate time periods.

In one example, input sensing may be performed during non-display update periods (e.g., sensing periods, input sensing periods or capacitive sensing periods) referred to as "blanking" periods or "distributed blanking" periods. These non-display update periods, also referred to as horizontal-blanking periods, long horizontal-blanking ("long h-blank") periods, vertical-blanking periods, in-frame blanking periods, etc., occur between display line and/or display frame updates. For example, a horizontal-blanking period may refer to the non-display update period that occurs after updating display line N, but before updating display line N+1, during which the display elements may be altered to update display line N+1. Additionally, if a video signal transmitted to the display device 160 is field-interlaced, input sensing may be performed between successive fields. Further, a long horizontal-blanking period may be generated by redistributing multiple horizontal-blanking periods, at least a portion of the vertical blanking periods, or some combination of the two, and combining the periods into a single non-display update period. For example, a long horizontal-blanking period may be generated by removing the non-display update periods that may occur between multiple display line updates and combining the non-display update periods into a single non-display update period. In one embodiment, a long horizontal-blanking period (or a sensing period) may be a non-display update period that is at least as long as the duration of a display line update period. In another embodiment, a long horizontal-blanking period may be a non-display update period (or a sensing period) that is longer than the duration of a display line update period.

Sensing periods may be implemented with various types of display devices. For example, fast-switching transistor displays enable display lines to be selected and updated relatively quickly, allowing display updating to be stopped to perform input sensing and subsequently resumed in an efficient manner. In contrast, slow-switching transistor displays may experience a time delay between the time at which a display line is selected and the time at which the corresponding row of transistors reaches a sufficient level (e.g., $V_{on}$) to receive pixel data. In one embodiment, a slow-switching transistor is any type of transistor that, when utilized in a gate select line for a display line, does not fully "open" or "activate" when the source lines are driven to update the display line. One exemplary type of slow-switching transistor is an amorphous silicon or an "a-Si" transistor. One exemplary type of fast-switching transistor is a low-temperature polycrystalline silicon (LTPS) transistor. In some embodiments, a fast-switching transistor in one display device may be considered a slow-switching transistor in another display device. The voltage-time behavior of an exemplary slow-switching transistor is shown in FIG. 3A, discussed below.

To compensate for switching delays and enable slow-switching devices to perform at a desired resolution and refresh rate, such devices may use a technique referred to as "pipelining," in which several consecutive gate select lines are driven in an overlapping manner. However, due to the overlapping nature of the gate select signals, there may be no period of time during which display lines are not selected and, thus, no blanking periods for performing input sensing. Consequently, implementing sensing periods with display devices that utilize slow-switching transistors presents a unique set of challenges.

Figure 3A:
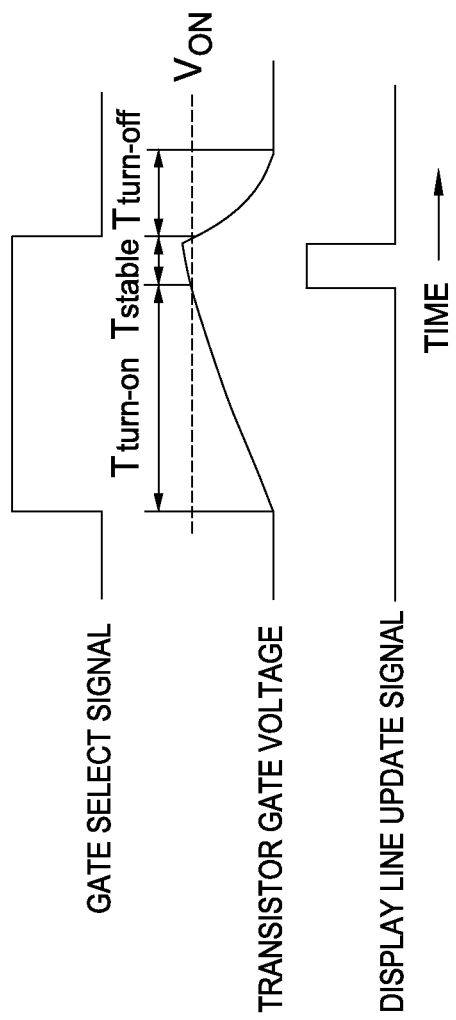
FIGS. 3A and 3B illustrate the voltages of slow-switching transistors as a function of time in accordance with embodiments of the invention.
Figure 3B:
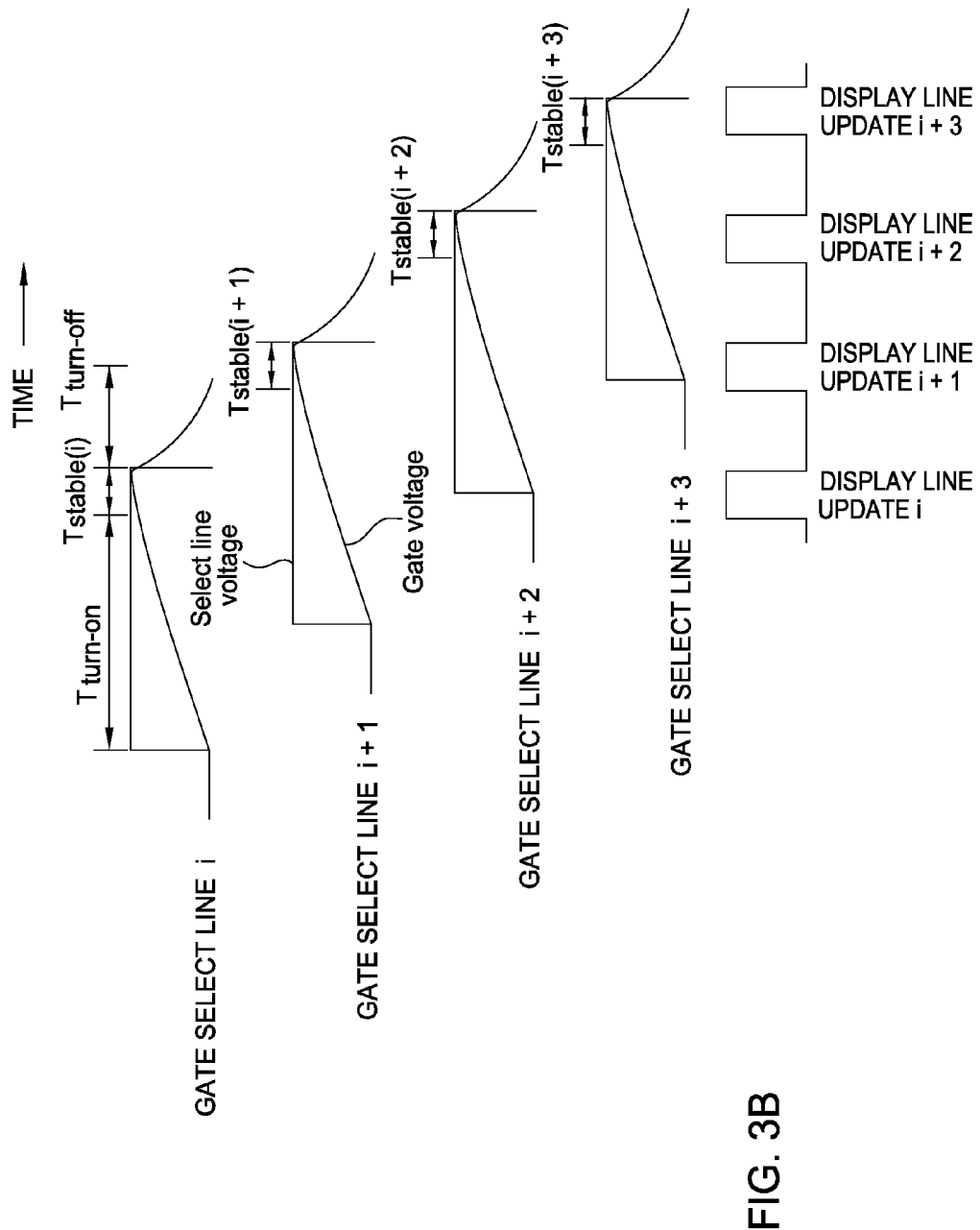

FIGS. 3A and 3B illustrate the voltages of slow-switching transistors as a function of time in accordance with embodiments of the invention. As shown, a time delay ($T_{turn-on}$) is associated with switching a transistor gate from a 'closed' state to an 'open' state. Once the gate reaches a threshold voltage ($V_{ON}$), the transistor enters an 'open' state for a time period $T_{stable}$, during which one or more sub-pixels associated with the transistor may be driven for display updating. In one embodiment, $T_{stable}$ is less than or equal to the time allotted to update each display line ($T_{update}$) of a display device having a particular refresh rate and resolution. Once the one or more sub-pixels have been updated, the gate select line associated with the transistor may be deselected, after which the transistor enters a 'closed' state.

In order to compensate for the time delay between the time at which the gate select line is first driven with a gate select signal and the time at which the gate voltage reaches a turn-on voltage, multiple gate select lines, each associated with one or more display lines, may be "pipelined." That is, the gate select lines may be driven in a sequential and overlapping manner such that the transistors corresponding to the display lines reach an 'on' state at different times, enabling each display line to be separately updated (e.g., via source lines) in a timely manner. One embodiment of this technique is illustrated in FIG. 3B. As shown in FIG. 3B, two or more gate select lines (e.g., line i and line i+1) may be driven in an overlapping manner such that the transistor(s) associated with each gate select line reach $V_{ON}$ at a different time (e.g., reach $V_{ON}$ in a desired sequence).

Figure 4A:
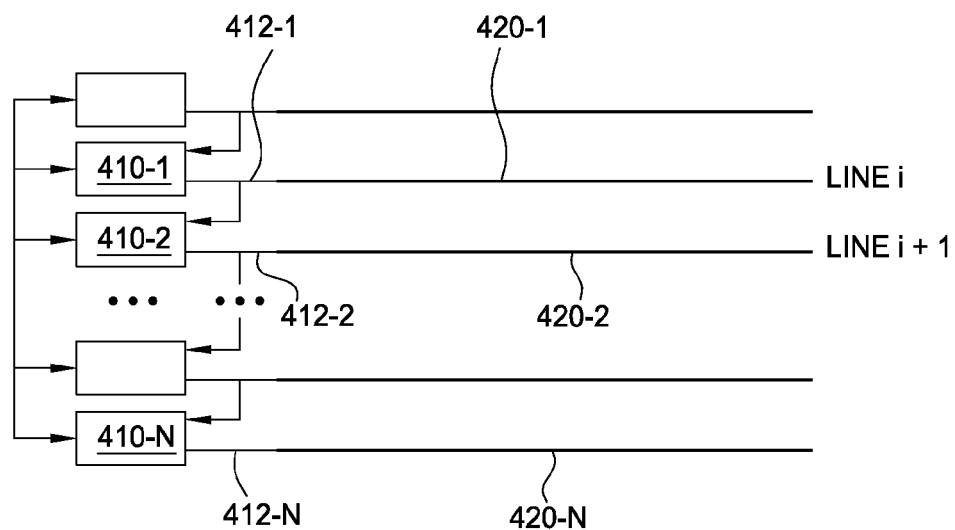
FIG. 4A illustrates a partial schematic view of register elements coupled to the gate select lines included in the display device of FIG. 1 in accordance with embodiments of the invention.

The pipelining technique described above may be implemented using a variety of different hardware and/or software configurations. For example, in various embodiments, pipelining may be accomplished by pre-charging a register element 410 associated with the next gate select line 420 (e.g., line i+1) while the register element 410 associated with the current gate select line 420 (e.g., line i) is being driven to select a display line for updating. Such a configuration is shown in FIG. 4A, which illustrates a partial schematic view of register elements 410 coupled to the gate select lines 420 included in the display device 160 of FIG. 1 in accordance with embodiments of the invention. As shown, the output 412 of each register element 410 may be coupled to an adjacent register element 410. Accordingly, when clocking of the display lines is performed, the register element 410 associated with the next display line (e.g., line i+1) may be pre-charged while the current display line (e.g., line i) is being selected for updating. This technique is shown in further detail in FIG. 4B, which illustrates the charging waveform of a register element 410-2 during display updating in accordance with embodiments of the invention. As shown, during time period 402, the register element 410-2 associated with line i+1 is pre-charged by the output 412-1 of the register element 410-1 associated with line i. Then, during the display update period 404 associated with display line i+1, register element 410-2 is further charged until the voltage across the register element 410-2 reaches the threshold voltage ($V_{ON}$).

Once gate select line 420-2 reaches the threshold voltage ($V_{ON}$), pixel data is driven to the pixels associated with display line i+1 through a plurality of source lines in order to update the display line. Concurrently, the output 412-2 of register element 410-2 may be used to pre-charge the next register element 410 (e.g., register element 410-3). Then, after display line i+1 is updated, the display line is deselected, the next display line (e.g., display line i+2) is selected, and pixel data associated with the next display line is driven to the next row of pixels through the source lines. This process is repeated until every line in the display device 160 has been updated.

Figure 5:
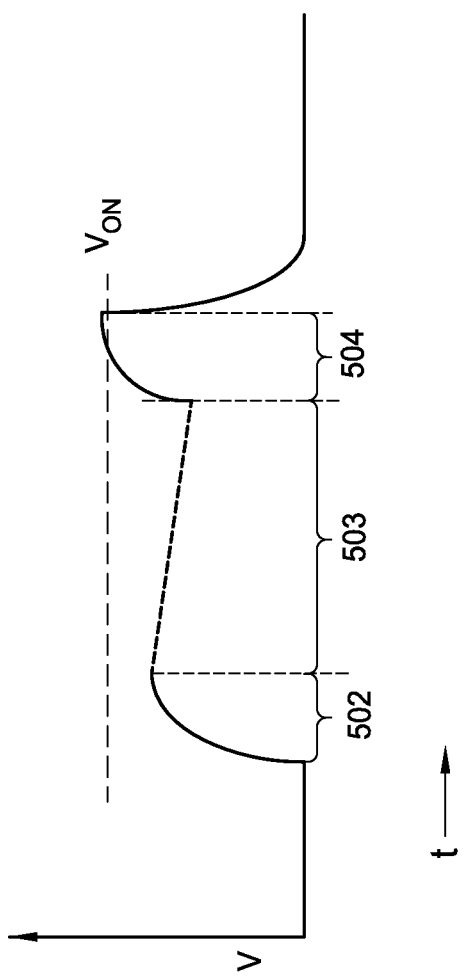
FIG. 5 illustrates the charging waveform of a register element when display updating is interrupted to perform input sensing in accordance with embodiments of the invention.

When input sensing is performed only during the vertical blanking periods of the display device 160, the pipelining process is not interrupted. In such embodiments, input sensing data is collected at a rate that is equal to the display refresh rate. In order to acquire input sensing data at a different rate (e.g. a higher rate) than the display refresh rate, the pipelining process may be interrupted. However, interrupting the pipelining process to acquire input sensing data may interfere with the pre-charge stage and/or affect the final voltage applied to the gate select line 420. This charging behavior is shown in FIG. 5, which illustrates the charging waveform of a register element 410 when display updating is interrupted to perform input sensing, in accordance with embodiments of the invention. As shown, the register element 410 may discharge (e.g., due to leakage) during the non-display update period 503, causing the voltage of the register element 410 to reach a lower-than-expected level at the beginning of charging period 504. Consequently, the register element 410 may not reach the threshold voltage ($V_{ON}$), or may remain above the threshold voltage ($V_{ON}$) for an insufficient duration of time, during charging period 504, producing display artifacts.

Figure 4B:
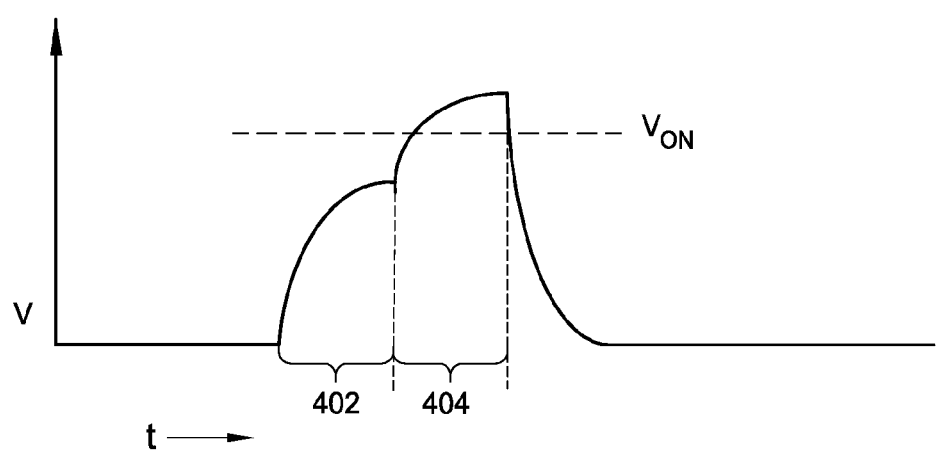
FIG. 4B illustrates the charging waveform of a register element during display updating in accordance with embodiments of the invention.

For example, with reference to FIGS. 4A and 4B, register element 410-1 may be charged during a display update period to update display line i. Concurrently, the output 412-1 of register element 410-1 may be used to pre-charge register element 410-2. After display line i is updated, displaying updating may be paused, and input sensing may be performed during a non-display update period, such as a long horizontal-blanking period. During the non-display update period, charge may leak from the register element 410-2, as shown in FIG. 5, causing the voltage across the register element 410-2 to decrease. As a result, once display updating is resumed after the non-display update period, the charge on register element 410-2 may be at a lower-than-expected level. Consequently, artifacts may be generated when updating display line i+1 and/or one or more additional display lines after display line i+1 (e.g., display line i+2) during the next display update period(s). Accordingly, in order to pre-charge the register element 410 to the expected level when resuming display updating after a non-display update period (e.g., non-display update period 503), one or more inactive register elements 411 may be included in the display device, as described below in further detail in conjunction with FIG. 6-8.

Reducing Display Artifacts when Resuming Display Updating

Figure 6:
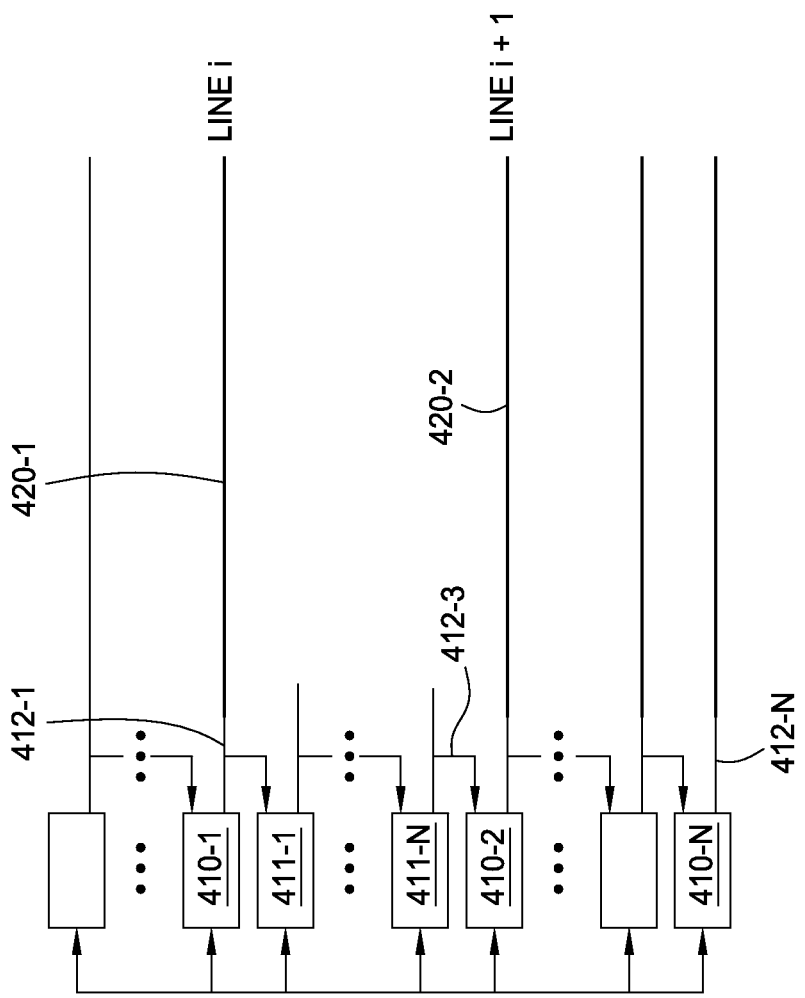
FIG. 6 illustrates a partial schematic view of inactive register elements disposed between register elements in the display device of FIG. 1 in accordance with embodiments of the invention.

FIG. 6 illustrates a partial schematic view of inactive register elements 411 disposed between register elements 410 in the display device 160 of FIG. 1 in accordance with embodiments of the invention. As shown, the output 412 (e.g., output 412-3) of an inactive register element 411-N may be coupled to the register element 410 associated with the next display line (e.g., register element 410-2 associated with display line i+1) to be updated after a non-display update period. However, the output of an inactive register element 411 is not coupled directly to a gate select line or display line. The inactive register element 411-N may be driven during the non-display update period, causing the register element 410 associated with the next display line to be pre-charged. Accordingly, the register element 410 associated with the next display line to be updated may be pre-charged to the expected level prior to the next display update period, enabling the register element 410 to reach the threshold voltage ($V_{ON}$) for the appropriate duration of time during the next display update period.

In some embodiments, a single inactive register element 411 may be used to pre-charge the register element 410 associated with the next display line to be updated after the non-display update period. In such embodiments, the inactive register element 411 may be coupled to the output 412-1 of the register element 410-1 associated with the last display line that is updated before the non-display update period (e.g., line i), enabling the register element 410-1 to pre-charge the inactive register element 411. Alternatively, the inactive register element(s) 411 may not be coupled to the output 412-1 of the register element 410-1 associated with the last display line that is updated before the non-display update period. In such embodiments, the inactive register element 411 may be driven during the non-display update period, but not pre-charged by register element 410-1.

In other embodiments, more than one inactive register element 411 may be used to pre-charge the register element 410 associated with the next display line to be updated after the non-display update period. For example, as shown in FIG. 6, multiple inactive register elements 411 (e.g., two or more) may be used such that one inactive register element 411-1 pre-charges the next inactive register element 411-N. The output of the last inactive register 411-N in the series may then be coupled to the register element 410 associated with the next display line to be updated after the non-display update period. Including multiple inactive register elements 411 may enable the voltage on the output 412-3 of the last inactive register 411-N to be more accurately determined and/or controlled. For example, if the register elements 410 and/or inactive register elements 411 are allowed to completely discharge during the non-display update period, several inactive register elements 411 may need to be driven before the voltage on the output 412 of each inactive register element 411 reaches an appropriate level.

Additionally, the time period for which each of the one or more inactive display elements 411 are driven may be increased or decreased so that the output 412-3 on the last inactive register element 411-N in the series reaches an appropriate level (e.g., approximately 80% of the threshold voltage or higher) to sufficiently pre-charge register element 410-2 for the next display update period. For example, the time period for which a particular inactive display element 411 is driven during the non-display update may be longer than the period of time for which the register elements 410 are driven during the display update periods.

As described above, any number of inactive register elements 411 may be driven during a given non-display update period. Further, a grouping of one or more inactive register elements 411 may be included in the display device 160 for each non-display update period that is to be observed during a single display frame (e.g., capacitive frame). In various embodiments, the register elements 410 and/or the inactive register elements 411 are selected by clocking a "token" between the register elements 410 and/or inactive register elements 411. As such, each register element 410 and/or inactive register element 411 may be coupled to a clock signal line that is configured to pass a token from one register to the next.

A capacitive load and/or resistive load may be coupled to the output 412 of one or more of the inactive register elements 411 in order to control the time required to charge the inactive register elements 411 to a particular level (e.g., to control the RC time constant). In some embodiments, the capacitive load coupled to an inactive register element 411 may be substantially similar to the capacitance of a gate select line to which a register element 410 is coupled. Accordingly, the charging behavior of the inactive register element(s) 411 may be substantially similar to the charging behavior of a register element 410, enabling the pre-charge applied to the register elements 410 by the inactive register elements 411 to be more accurately predicted and/or controlled.

Figure 7:
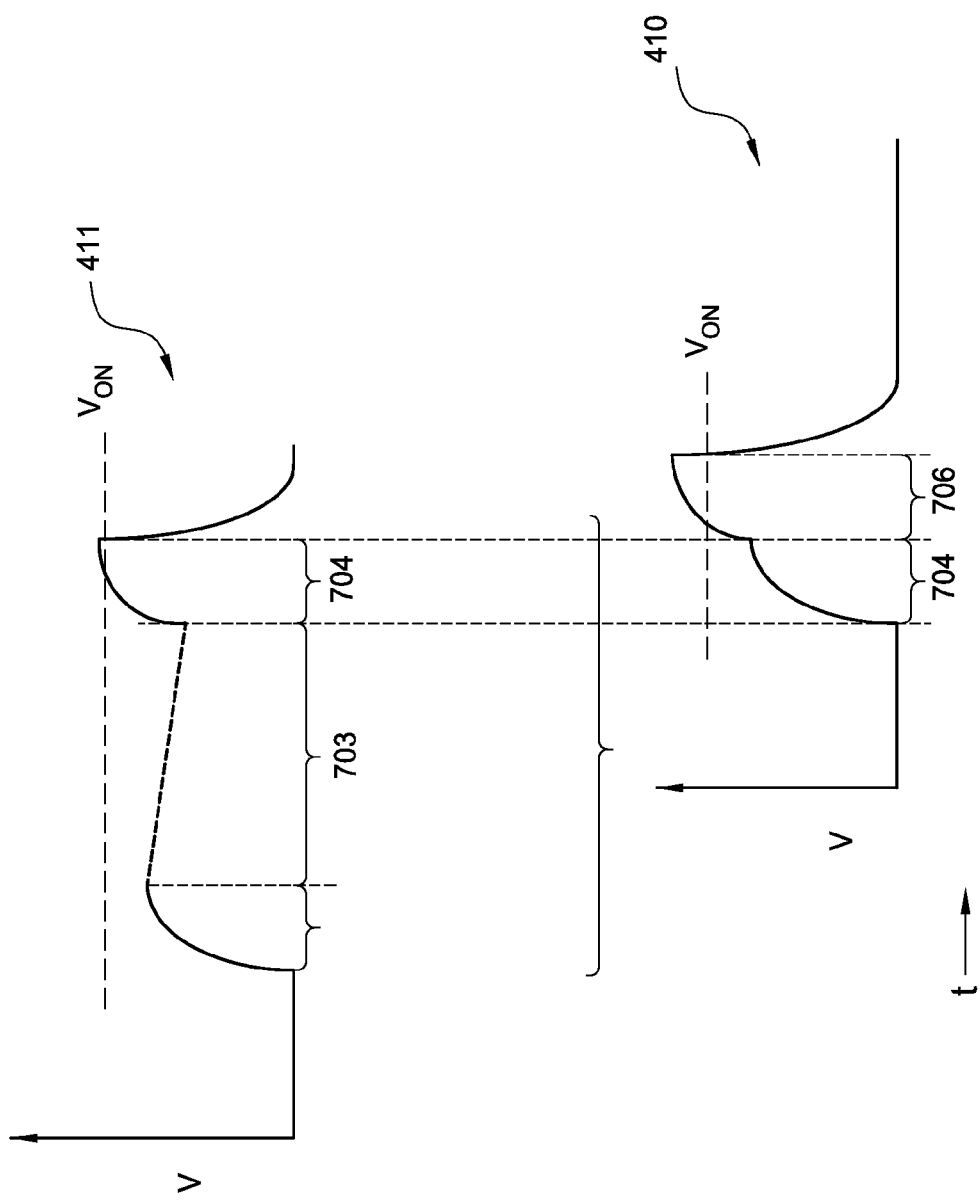
FIG. 7 illustrates the charging waveforms of an inactive register element and a register element associated with the first display line that is updated after a non-display update period in accordance with embodiments of the invention.

FIG. 7 illustrates the charging waveforms of an inactive register element 411 and a register element 410 associated with the first display line that is updated after a non-display update period, in accordance with embodiments of the invention. As shown, when a single inactive register element 411 is disposed between the register element 410 associated with the last display line updated before the non-display update period 703 and the register element 410 associated with the first display line updated after the non-display update period 703, the inactive register element 411 may be discharged (e.g. due to leakage) during the non-display update period 703. As a result, during the next charging period 704, the inactive register element 411 may not reach the threshold voltage ($V_{ON}$). However, since the inactive register element 411 is not coupled to a display line, display artifacts are not generated. Accordingly, discharge of the inactive register element 411 does not negatively impact the display device 160. Further, as shown in FIG. 7, the register element 410 associated with the first display line updated after the non-display update period 703 is pre-charged to the appropriate level, enabling the register element 410 to reach the threshold voltage ($V_{ON}$) during the next display update period 706.

Figure 8:
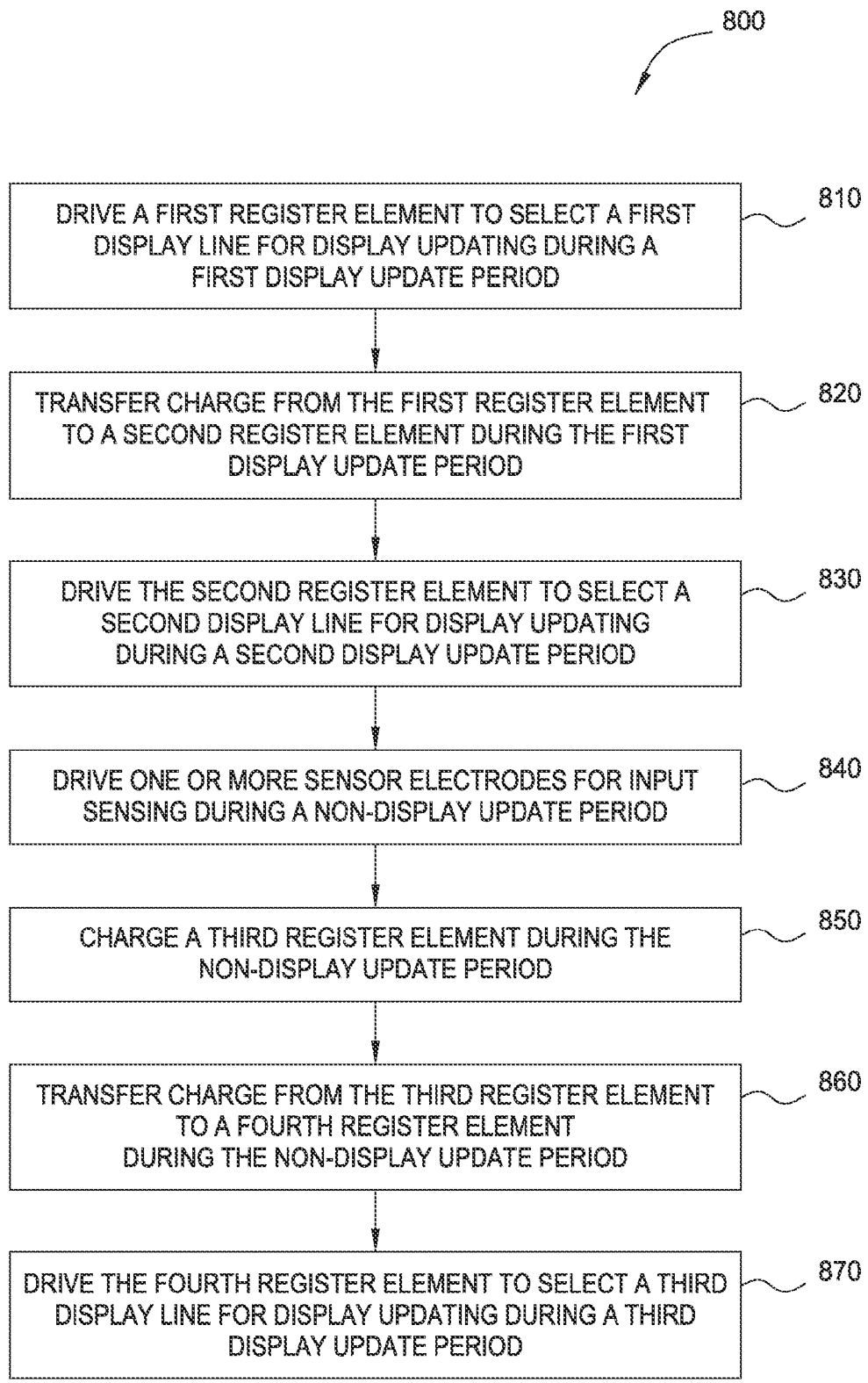
FIG. 8 is a flow chart of a method for reducing display artifacts when resuming display updating with the input device in accordance with embodiments of the invention.

FIG. 8 is a flow chart of a method 800 for reducing display artifacts when resuming display updating with the input device 100 in accordance with embodiments of the invention. Although the method 800 is described in conjunction with FIGS. 1-7, persons skilled in the art will understand that any system configured to perform the method, in any appropriate order, falls within the scope of the present invention.

The method 800 begins at step 810, where the driver module 240 drives a first register element to select a first display line for display updating during a first display update period. At step 820, the first register element transfers charge to a second register element during the first display update period. At step 830, the driver module 240 drives the second register element to select a second display line for updating during a second display update period. The first register element and second register element may be coupled to a first gate electrode and second gate electrode, respectively. Additionally, the first gate electrode and second gate electrode may be configured to activate the first display line and the second display line for display updating, respectively.

Next, at step 840, the driver module 240 drives one or more sensor electrodes (e.g., the first plurality of sensor electrodes 210) for input sensing during a non-display update period. At step 850, one or more register elements (e.g., one or more inactive register elements 411, such as a third register element) are charged during the non-display update period. These register elements may be charged to a level that is at or above the threshold voltage ($V_{ON}$), or the register elements may be charged to a level that is below the threshold voltage ($V_{ON}$). Further, the level to which each of the register elements is charged may be higher than the level to which the previous register element was charged, enabling the register elements to ramp up to the threshold voltage at the beginning of the non-display update period. In various embodiments, the register elements that are charged during the non-display update period are not directly coupled to a display line. Each register element included in the one or more register elements may transfer charge to (e.g., pre-charge) an adjacent register element and/or pass a token to an adjacent register element, as described above in conjunction with FIG. 6.

At step 860, the last register element included in the one or more register elements (i.e., the register element that is coupled to the first register element associated with the first display line to be updated after the non-display update period) transfers charge to a fourth register element during the non-display update period. At step 870, the driver module 240 drives the fourth register element to select a third display line for display updating during a third display update period. The fourth register element may be coupled to a third gate electrode that is configured to activate the third display line for display updating.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A display line selection system for a display device having an integrated capacitive sensing device, the display line selection system comprising:
   a first register element coupled to a first gate electrode and configured to:
      select the first gate electrode to update a first display line during a first display update period; and
      transfer charge to a second register element during the first display update period thereby pre-charging a second gate electrode coupled to the second register element by changing a voltage on the second gate electrode;
   the second register element configured to select the second gate electrode to update a second display line during a second display update period;
   a third register element configured to:
      receive charge during a non-display update period; and
      transfer charge to a fourth register element during the non-display update period thereby pre-charging a third gate electrode coupled to the fourth register element by changing a voltage on the third gate electrode; and
   the fourth register element configured to select the third gate electrode to update a third display line during a third display update period.

2. The display line selection system of claim 1, wherein the third register element is disposed between the second register element and the fourth register element.

3. The display line selection system of claim 1, wherein the third register element is not directly coupled to a display line.

4. The display line selection system of claim 1, further comprising a fifth register element configured to:
   receive charge during the non-display update period;
   transfer charge to the third register element during the non-display update period; and
   pass a token to the third register element during the non-display update period.

5. The display line selection system of claim 1, wherein the non-display update period is an input sensing period that occurs between the second display update period and the third display update period.

6. The display line selection system of claim 1, further comprising a capacitive element coupled to the third register element, wherein a capacitance of the capacitive element is substantially similar to a capacitance of at least one of the first gate electrode, the second gate electrode, and the third gate electrode.

7. The display line selection system of claim 1, wherein the first display line, the second display line, and the third display line are coupled to amorphous silicon transistors.

8. The display line selection system of claim 1, wherein the first register element, the second register element, the third register element, and the fourth register element are disposed on a thin-film transistor layer of the display device.

9. The display line selection system of claim 1, further comprising one or more sensor electrodes configured to be driven for input sensing during the non-display update period, wherein each sensor electrode included in the one or more sensor electrodes comprises one or more common electrodes included in a plurality of common electrodes, and a first common electrode included in the plurality of common electrodes is configured to be driven to update the first display line during the first display update period.

10. A method of input sensing with a display device having an integrated capacitive sensing device, the method comprising:
 driving a first register element coupled to a first gate electrode to select a first display line for display updating during a first display update period;
 transferring charge from the first register element to a second register element during the first display update period thereby pre-charging a second gate electrode coupled to the second register element by changing a voltage on the second gate electrode;
 driving the second register element to select a second display line for display updating during a second display update period;
 driving one or more sensor electrodes for input sensing during a non-display update period;
 charging a third register element during the non-display update period;
 transferring charge from the third register element to a fourth register element during the non-display update period thereby pre-charging a third gate electrode coupled to the fourth register element by changing a voltage on the third gate electrode; and
 driving the fourth register element to select a third display line for display updating during a third display update period.

11. The method of claim 10, wherein the non-display update period occurs after the second display update period and before the third display update period.

12. The method of claim 10, wherein charging the third register element does not activate a display line for display updating.

13. The method of claim 10, further comprising:
 charging a fifth register element during the non-display update period;
 transferring charge from the fifth register element to the third register element during the non-display update period; and
 passing a token from the fifth register element to the third register element during the non-display update period.

14. The method of claim 10, wherein charging the third register element during the non-display update period comprises charging a capacitive element coupled to the third register element, wherein a capacitance of the capacitive element is substantially similar to a capacitance of at least one of the first gate electrode, the second gate electrode, and the third gate electrode.

15. A processing system for a display device having an integrated sensing device, the processing system comprising:
 a driver module comprising driver circuitry, the driver module having outputs configured for coupling to a plurality of register elements and a plurality of sensor electrodes, the driver module configured for:
  driving a first register element coupled to a first gate electrode to select a first display line for display updating during a first display update period and transfer charge to a second register element during the first display update period to pre-charge a second gate electrode coupled to the second register element by changing a voltage on the second gate electrode;
  driving the second register element to select a second display line for display updating during a second display update period;
  driving one or more sensor electrodes for input sensing during a non-display update period;
  driving a third register element during the non-display update period to transfer charge to a fourth register element to pre-charge a third gate electrode coupled to the fourth register element by changing a voltage on the third gate electrode; and
  driving the fourth register element to select a third display line for display updating during a third display update period; and
 a receiver module configured for coupling to a plurality of receiver electrodes and configured for receiving resulting signals with the plurality of receiver electrodes when the one or more sensor electrodes are driven for input sensing.

16. The processing system of claim 15, wherein the non-display update period occurs after the second display update period and before the third display update period.

17. The processing system of claim 15, wherein driving the third register element does not activate a display line for display updating.

18. The processing system of claim 15, wherein the driver module is further configured for:
 driving a fifth register element during the non-display update period to transfer charge to the third register element; and
 causing a token to be passed from the fifth register element to the third register element during the non-display update period.

19. The processing system of claim 15, wherein driving the third register element during the non-display update period comprises charging a capacitive element coupled to the third register element, wherein a capacitance of the capacitive element is substantially similar to a capacitance of at least one of the first gate electrode, the second gate electrode, and the third gate electrode.

20. The processing system of claim 15, wherein each sensor electrode included in the one or more sensor electrodes comprises one or more common electrodes included in a plurality of common electrodes, and the driver module is further configured for driving a first common electrode included in the plurality of common electrodes to update the first display line during the first display update period.

* * * * *